(12) United States Patent
Dasgupta

(10) Patent No.: US 8,429,683 B2
(45) Date of Patent: Apr. 23, 2013

(54) PROGRAM VIEWING HISTORY

(75) Inventor: Sudeep Dasgupta, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 854 days.

(21) Appl. No.: 11/690,644

(22) Filed: Mar. 23, 2007

(65) Prior Publication Data

US 2008/0235348 A1   Sep. 25, 2008

(51) Int. Cl.
*H04H 60/33* (2008.01)

(52) U.S. Cl.
USPC .................................................... 725/9

(58) Field of Classification Search ............ 725/9–21, 725/46
See application file for complete search history.

(56) References Cited

U.S. PATENT DOCUMENTS

| | | | | |
|---|---|---|---|---|
| 5,872,588 | A * | 2/1999 | Aras et al. ..................... | 725/14 |
| 2002/0124252 | A1* | 9/2002 | Schaefer et al. ............... | 725/33 |
| 2003/0067554 | A1* | 4/2003 | Klarfeld et al. ................ | 725/34 |
| 2003/0115589 | A1* | 6/2003 | D'Souza et al. ............... | 725/10 |
| 2003/0121041 | A1* | 6/2003 | Mineyama ..................... | 725/46 |
| 2004/0101280 | A1* | 5/2004 | Tobiishi ......................... | 386/66 |
| 2004/0163130 | A1* | 8/2004 | Gray et al. ................... | 725/132 |
| 2005/0102696 | A1* | 5/2005 | Westberg ....................... | 725/46 |
| 2005/0235318 | A1* | 10/2005 | Grauch et al. ................. | 725/46 |
| 2005/0246732 | A1* | 11/2005 | Dudkiewicz et al. .......... | 725/13 |
| 2006/0161425 | A1* | 7/2006 | Lee et al. ..................... | 704/201 |
| 2007/0061832 | A1* | 3/2007 | Kim et al. ..................... | 725/14 |
| 2007/0186267 | A1* | 8/2007 | Ohde et al. .................. | 725/135 |
| 2008/0059521 | A1* | 3/2008 | Hutson et al. .............. | 707/104.1 |

FOREIGN PATENT DOCUMENTS

WO   WO 2005022914 A1 *   3/2005

* cited by examiner

*Primary Examiner* — Scott Beliveau
*Assistant Examiner* — Michael Telan

(57) ABSTRACT

A method may include tracking program viewing information via a set-top box and storing the tracked program viewing information.

25 Claims, 16 Drawing Sheets

DISPLAY

PROGRAM VIEWING HISTORY

AT THIS TIME LAST WEEK, YOU WATCHED THE STAND UP COMEDY SHOW ON CHANNEL 84

120
JULY 12 9:00PM

SET-TOP BOX

100

| USER ID 610 | DATE 620 | TIME 630 | CHANNEL 640 | PROGRAM ID 660 |
|---|---|---|---|---|
| ID | 07072006 | 09:00 | 34 | TALK SHOW |
| ID | 07072006 | 10:00 | 71 | NEWS |
| ID | 07072006 | 10:30 | 701 | COMEDY SHOW |
| ID | 07072006 | 11:00 | 304 | MOVIE |
| ... | ... | ... | ... | ... |
| ID | DATE | TIME | CHANNEL | PROGRAM |

FIG. 6

FIG. 10A
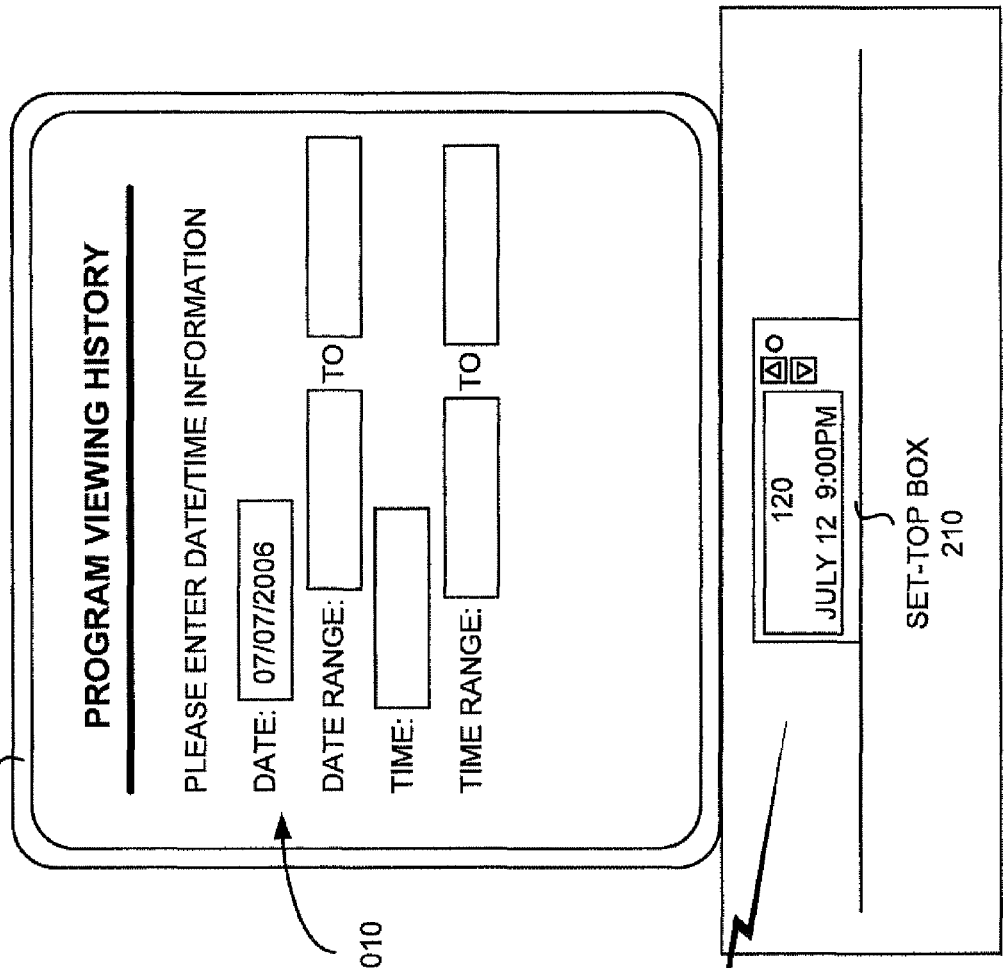
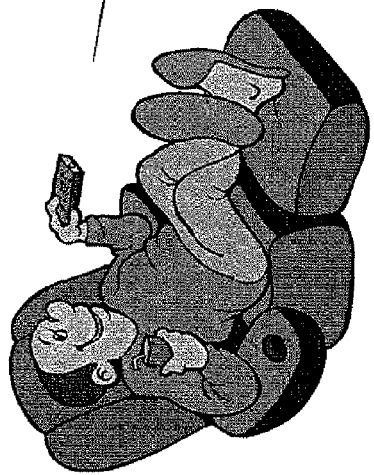

FIG. 10B
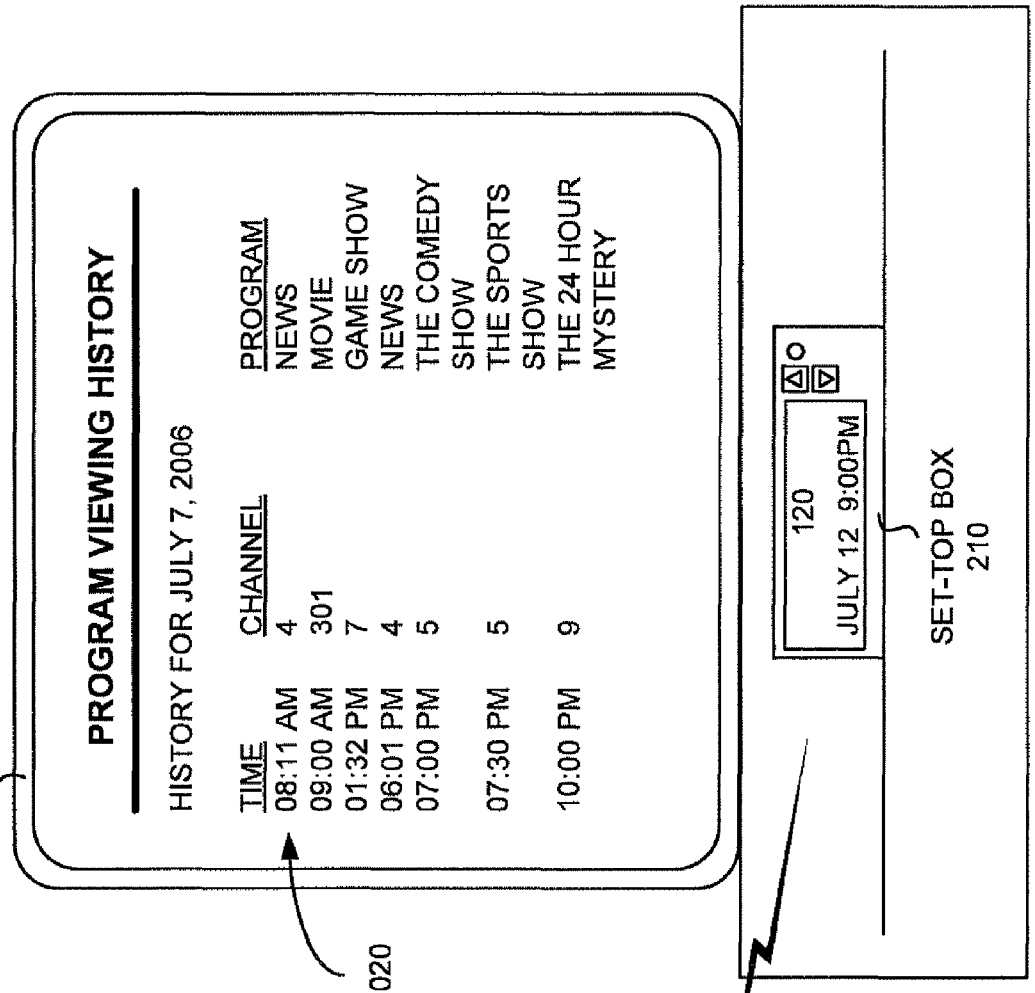
PROGRAM VIEWING HISTORY
HISTORY FOR JULY 7, 2006
| TIME | CHANNEL | PROGRAM |
|---|---|---|
| 08:11 AM | 4 | NEWS |
| 09:00 AM | 301 | MOVIE |
| 01:32 PM | 7 | GAME SHOW |
| 06:01 PM | 4 | NEWS |
| 07:00 PM | 5 | THE COMEDY SHOW |
| 07:30 PM | 5 | THE SPORTS SHOW |
| 10:00 PM | 9 | THE 24 HOUR MYSTERY |
DISPLAY 220
1020
120  JULY 12  9:00PM
SET-TOP BOX 210
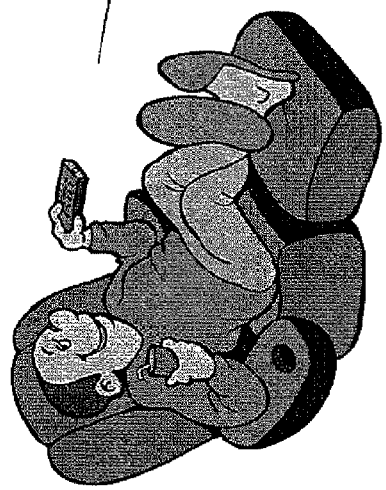
1000

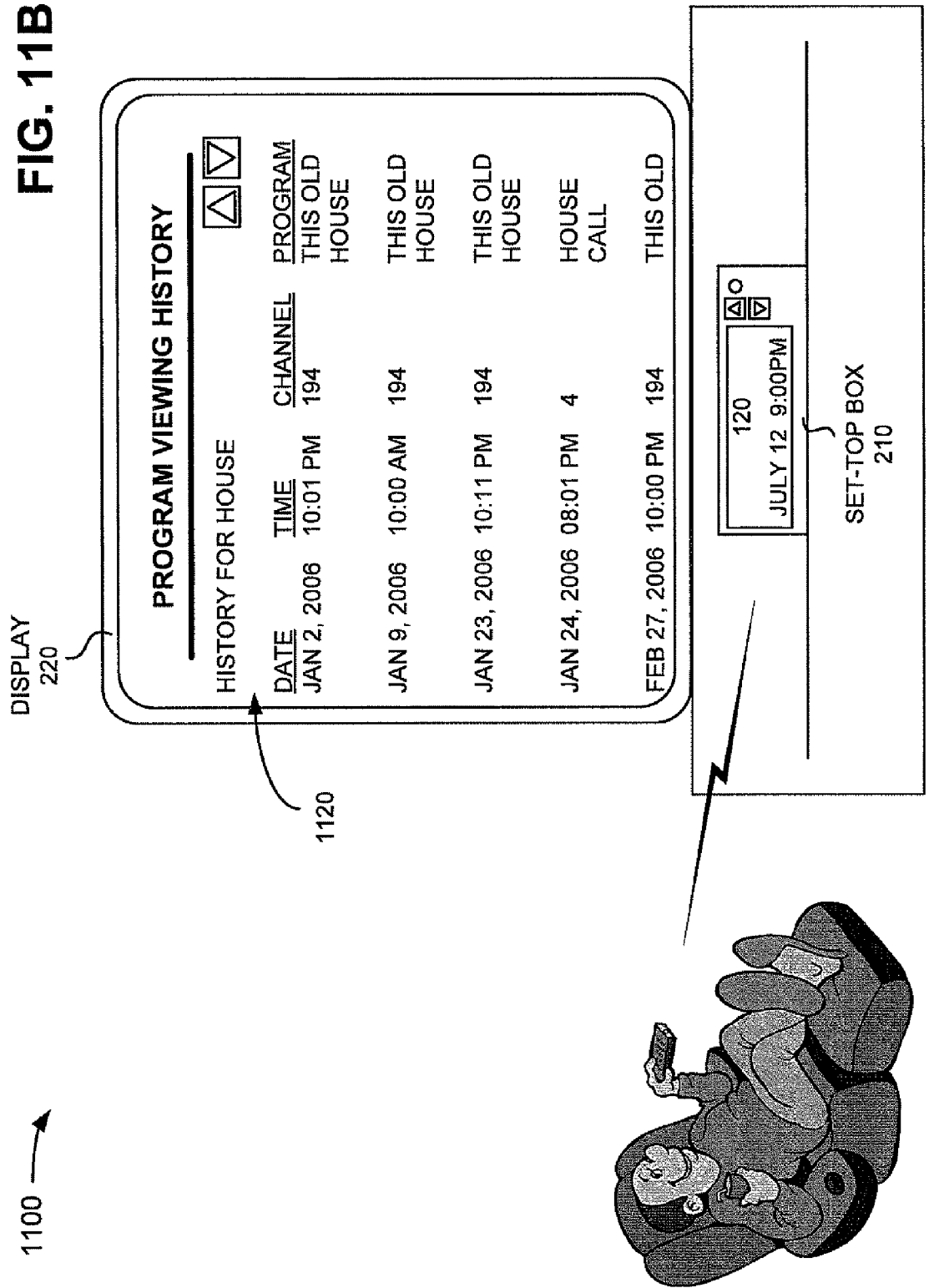

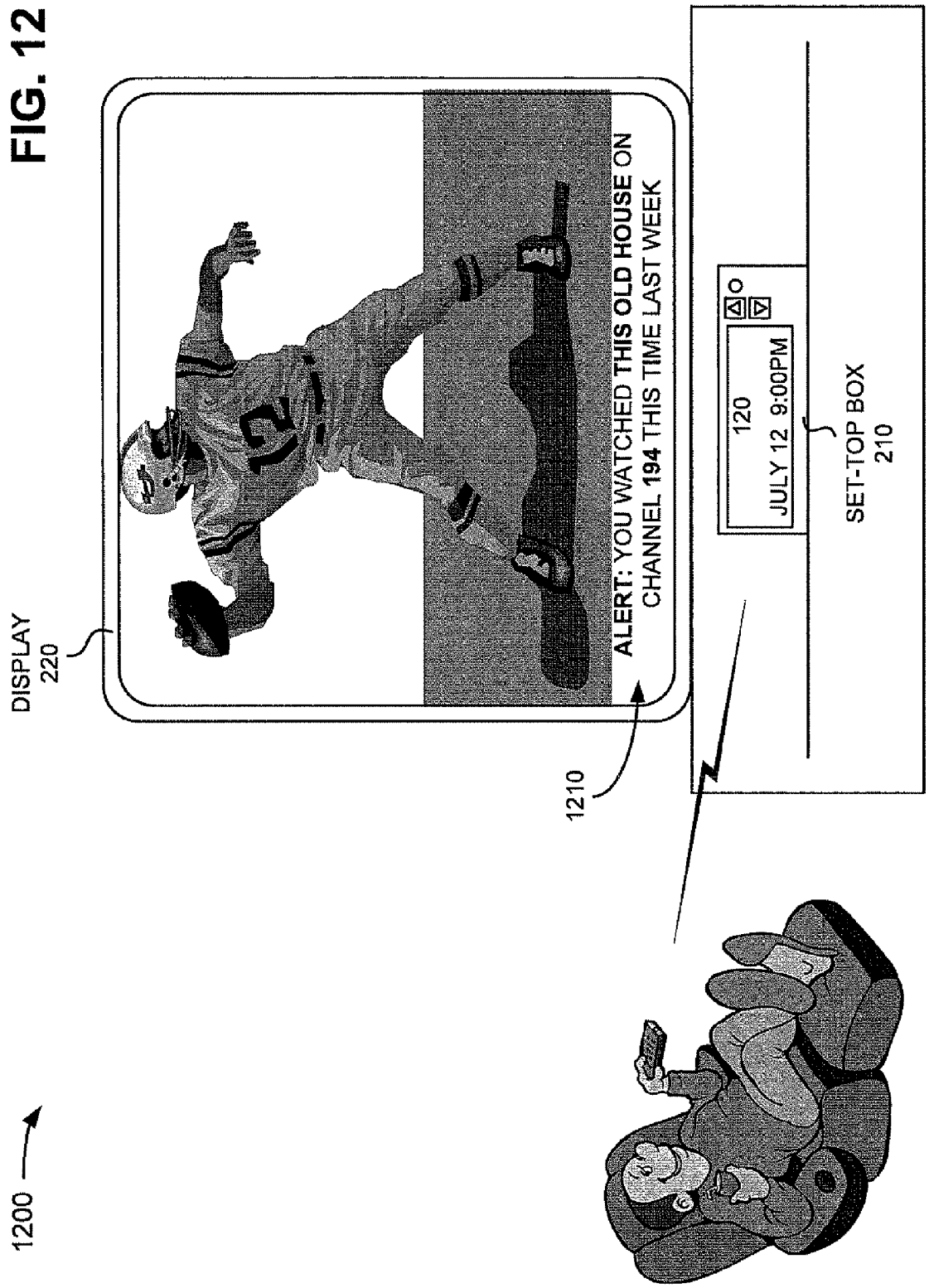

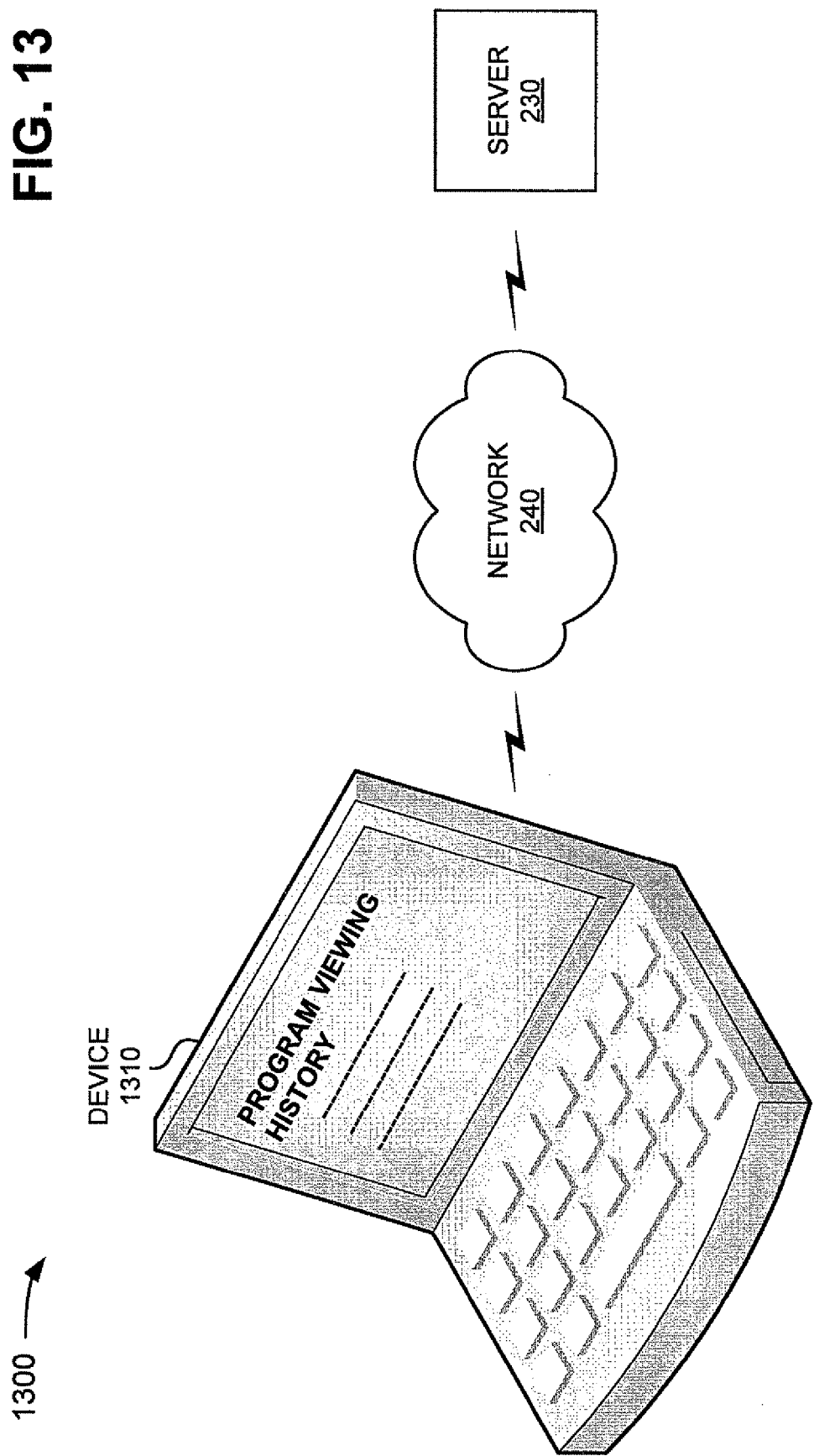

PROGRAM VIEWING HISTORY

BACKGROUND INFORMATION

Television distribution systems, such as fiber optic networks, cable networks, and satellite networks, provide users with a large number of television programs. For example, it is not uncommon for a user to have the ability to watch more than ten different channels dedicated only to sports.

BRIEF DESCRIPTION OF THE DRAWINGS

FIG. 6 is a portion of an exemplary database that may be associated with the server of FIG. 2;

FIGS. 10A to 13 illustrate examples of the processing described in FIGS. 8 and 9.

DETAILED DESCRIPTION OF PREFERRED EMBODIMENTS

The following detailed description of exemplary embodiments refers to the accompanying drawings. The same reference numbers in different drawings may identify the same or similar elements. Also, the following detailed description does not limit the invention.

Figure 1:
FIG. 1 is an exemplary diagram illustrating a concept described herein.

FIG. 1 is an exemplary diagram illustrating a concept 100 described herein. As illustrated, a set-top box may be associated with a display. In one embodiment, the set-top box may track the programs that the user is watching, thereby creating a list of programs. The list of programs may include the identity of the programs, as well as the dates and times that the programs were viewed. The list of programs may be stored locally at the set-top box or remotely at, for example, a server. In this way, a history of program viewing may be created. The user may then determine what he/she watched at a certain day/time, which may help the user determine what to currently watch. Moreover, the list of programs may aid in establishing parental controls (e.g., parents may track what their children are watching).

While the foregoing description uses terminology relating to a user watching (or viewing) a program, it will be appreciated that this terminology refers to a set-top box being tuned to the program whether or not the user is actually watching the program. For example, if the set-top box is tuned to a program so that the user can record the program (e.g., via a video cassette recorder, a digital video recorder, etc.), this may be considered as a user watching the program.

Figure 2:
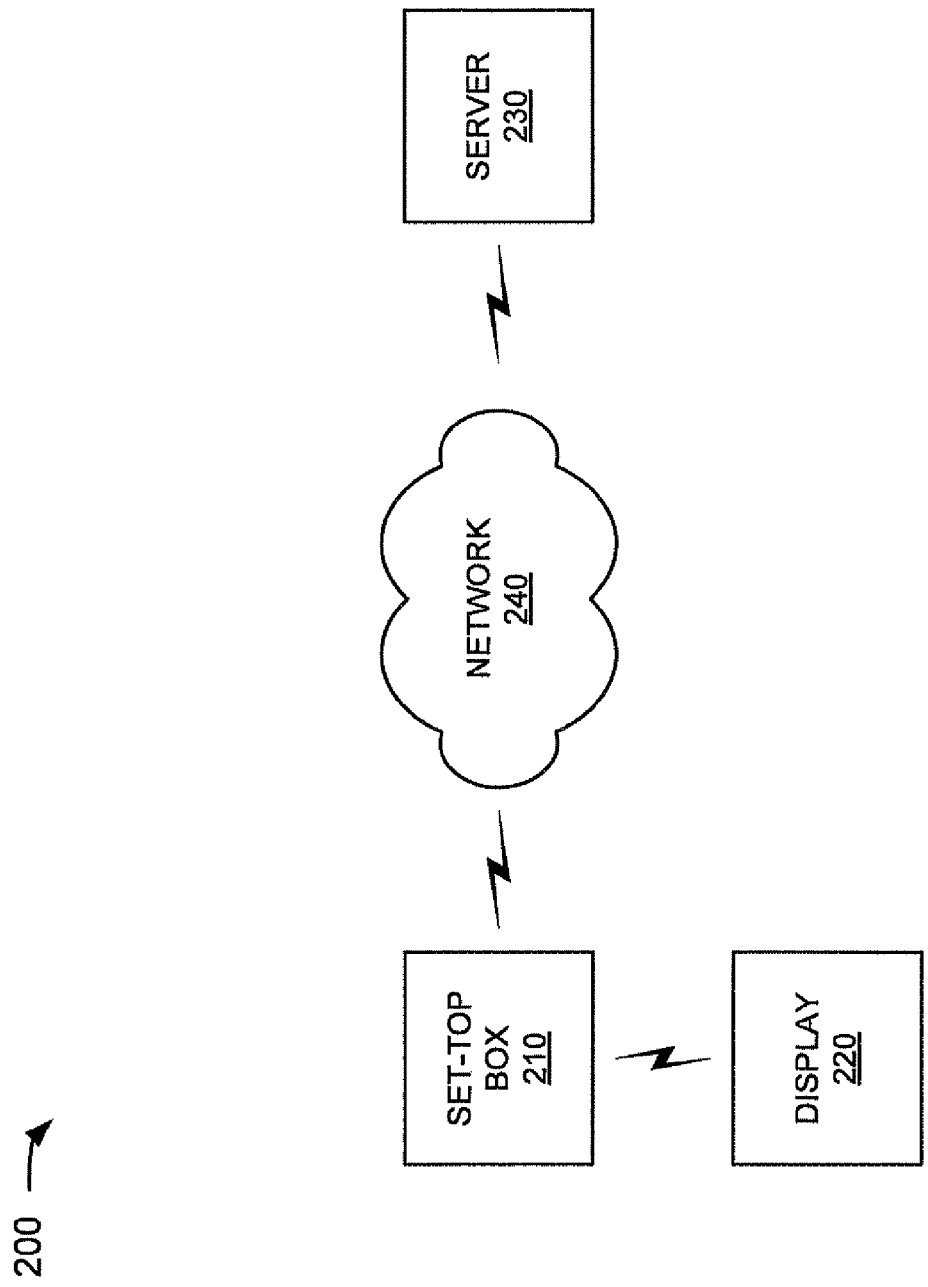
FIG. 2 is an exemplary network in which systems and methods, consistent with exemplary embodiments, may be implemented.

FIG. 2 is an exemplary network in which systems and methods, consistent with exemplary embodiments, may be implemented. As illustrated, network 200 may include a set-top box 210, a display 220, a server 230, and a network 240. The number of set-top boxes 210, displays 220, servers 230, and networks 240 illustrated in FIG. 2 is provided for simplicity. In practice, there may be more set-top boxes 210, displays 220, servers 230, and networks 240. Moreover, it will be appreciated that one or more devices in FIG. 2 may perform the functions described as being performed by one or more other devices illustrated in FIG. 2.

Set-top box 210 may include a device that receives television programming and provides the television programming to display 220. Set-top box 210 may further allow a user to alter the programming provided to display 220 based on a signal (e.g., a channel up or channel down signal) from, for example, a remote control. In one embodiment, set-top box 210 may track information relating to programs provided to display 220. In another embodiment, set-top box 210 may track information relating to programs output to other devices (not shown), such as a video cassette recorder (VCR), a digital video recorder (DVR), external storage device, or a remote viewing device, such as a Slingbox™ from Sling Media. Set-top box 210 may provide some or all of the tracked program viewing information to a server, such as server 230. Set-top box 210 may also obtain tracked program viewing information and provide the obtained program viewing information to display 220.

Display 220 may include any conventional display that is capable of displaying television programming. Display 220 may be implemented as a stand-alone device and/or may be integrated into another device, such as a remote control. In one embodiment, some or all of the functions described as being performed by set-top box 210 may be performed by display 220.

Server 230 may include a server entity. An entity may be defined as a device, such as a computer or another type of computation or communication device, a thread or process running on one of these devices, and/or an object executable by one of these devices. In one embodiment, server 230 may receive and store program viewing information from set-top box 210 and provided requested program viewing information to set-top box 210.

Network 160 may include one or more networks of any type, including a Public Land Mobile Network (PLMN), a Public Switched Telephone Network (PSTN), a local area network (LAN), a metropolitan area network (MAN), a wide area network (WAN), a private network, the Internet, an intranet, and/or another type of network.

Figure 3:
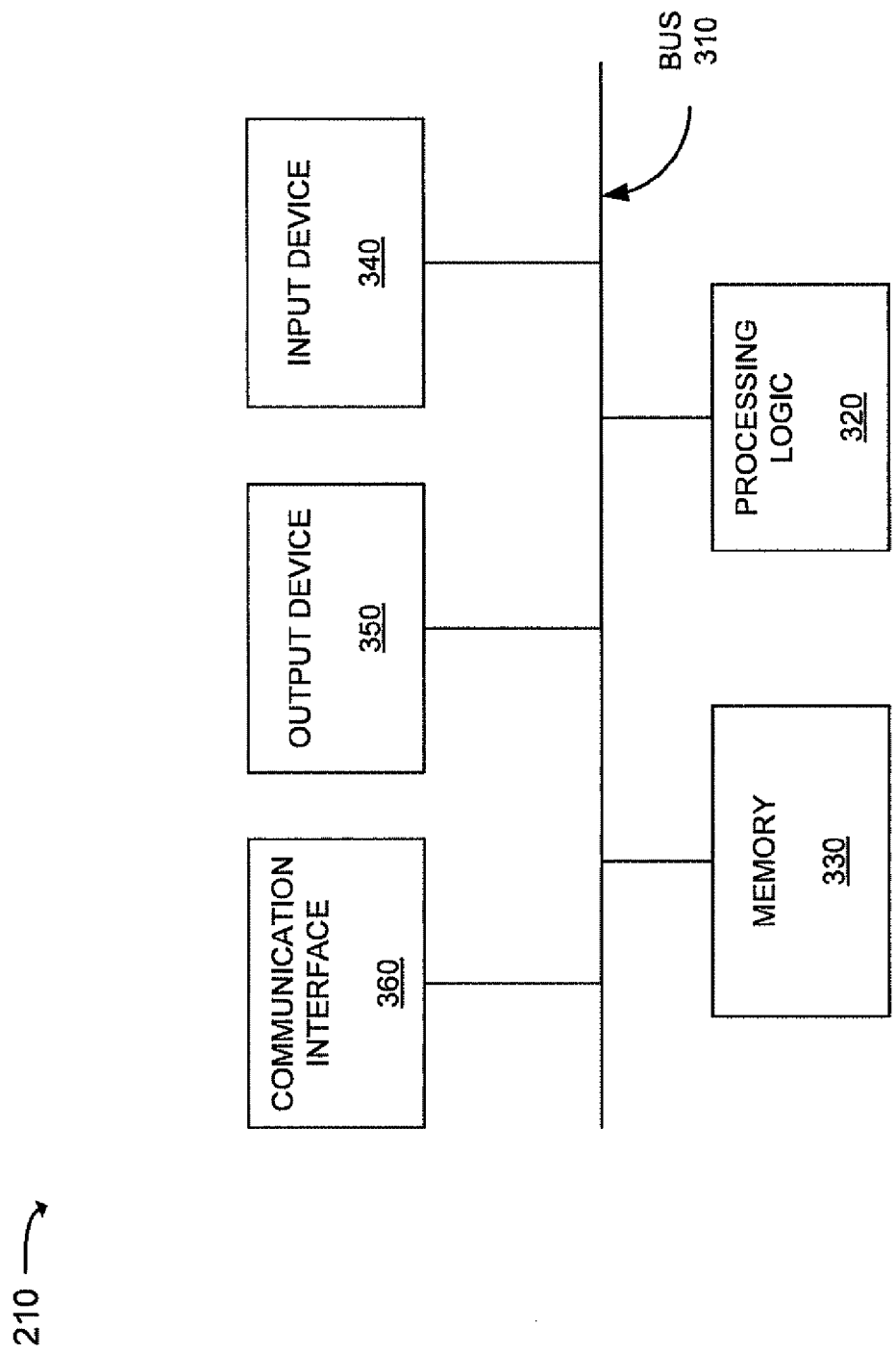
FIG. 3 is an exemplary block diagram of the set-top box of FIG. 2.

FIG. 3 is an exemplary block diagram of set-top box 210. As illustrated, set-top box 210 may include a bus 310, processing logic 320, a memory 330, an input device 340, an output device 350, and a communication interface 360. It will be appreciated that set-top box 210 may include additional (or other) components than illustrated in FIG. 3.

Bus 310 may include a path that permits communication among the elements of set-top box 210. Processing logic 320 may include a processor, microprocessor, or other type of processing logic, such as an application specific integrated circuit (ASIC), field programmable gate array (FPGA), etc., that may interpret and execute instructions. Memory 330 may include a random access memory (RAM) or another type of dynamic storage device that may store information and instructions for execution by processing logic 320, read only memory (ROM) or another type of static storage device that may store static information and instructions for use by processing logic 320, and/or another type of storage device.

Input device 340 may include a mechanism that permits an operator to input information to set-top box, such as buttons or a touch-screen interface. Output device 350 may include a mechanism that outputs information to the operator, such as a display. Communication interface 360 may include any transceiver-like mechanism that enables set-top box 210 to receive and/or send information from/to other devices and/or systems, such as server 230, display 220, a remote control, one or more entertainment components (e.g., a speaker, a video recorder, etc.), etc.

As will be described in detail below, set-top box 210 may perform certain operations. Set-top box 210 may perform these, and other operations, in response to processing logic 320 executing software instructions contained in a computer-readable medium, such as memory 330. A computer-readable medium may be defined as a physical or logical memory device and/or carrier wave.

The software instructions may be read into memory 330 from another computer-readable medium or from another device via communication interface 360. The software instructions contained in memory 330 may cause processing logic 320 to perform processes that will be described later. Alternatively, hardwired circuitry may be used in place of, or in combination with, software instructions to implement processes consistent with exemplary embodiments. Thus, embodiments described herein are not limited to any specific combination of hardware circuitry and software.

Figure 4:
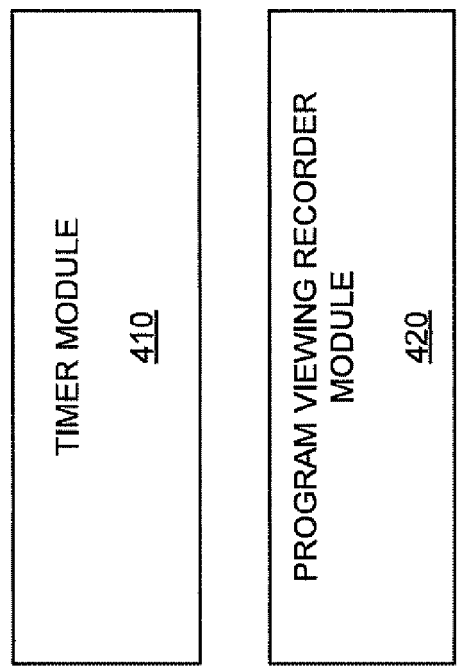
FIG. 4 is an exemplary functional diagram of a portion of the set-top box of FIG. 2.

FIG. 4 is an exemplary functional diagram of a portion of set-top box 210 according to an exemplary embodiment. As illustrated, set-top box 210 may include a timer module 410 and a program viewing recorder module 420. It will be appreciated that set-top box 210 may include other modules (not shown) that aid in tracking and providing program viewing information.

Timer module 410 may include a group of first timers that may track the amount of time that set-top box 210 is tuned to a channel. For example, when set-top box 210 is tuned to a first channel, an initial first timer may be initiated. If set-top box 210 is tuned to a second channel, another first timer may be initiated. Timer module 420 may also include one or more second timers that may track the amount of time that set-top box 210 is tuned away from a channel. For example, when set-top box 210 is tuned to a first channel and then is tuned to a second channel, a second timer may track the amount of time that set-top box 210 is tuned away from the first channel. In one embodiment, timer module 410 may further include one or more third timers that may track an initial amount of time that set-top box 210 is tuned to a channel. The third timers may be used to determine whether to initiate a first timer for the channel, as will be described in further detail below.

Program viewing recorder module 420 may record program viewing information relating to programs to which set-top box 210 is tuned. Program viewing recorder module 420 may further retrieve recorded program viewing information automatically or in response to a request from a user.

Figure 5:
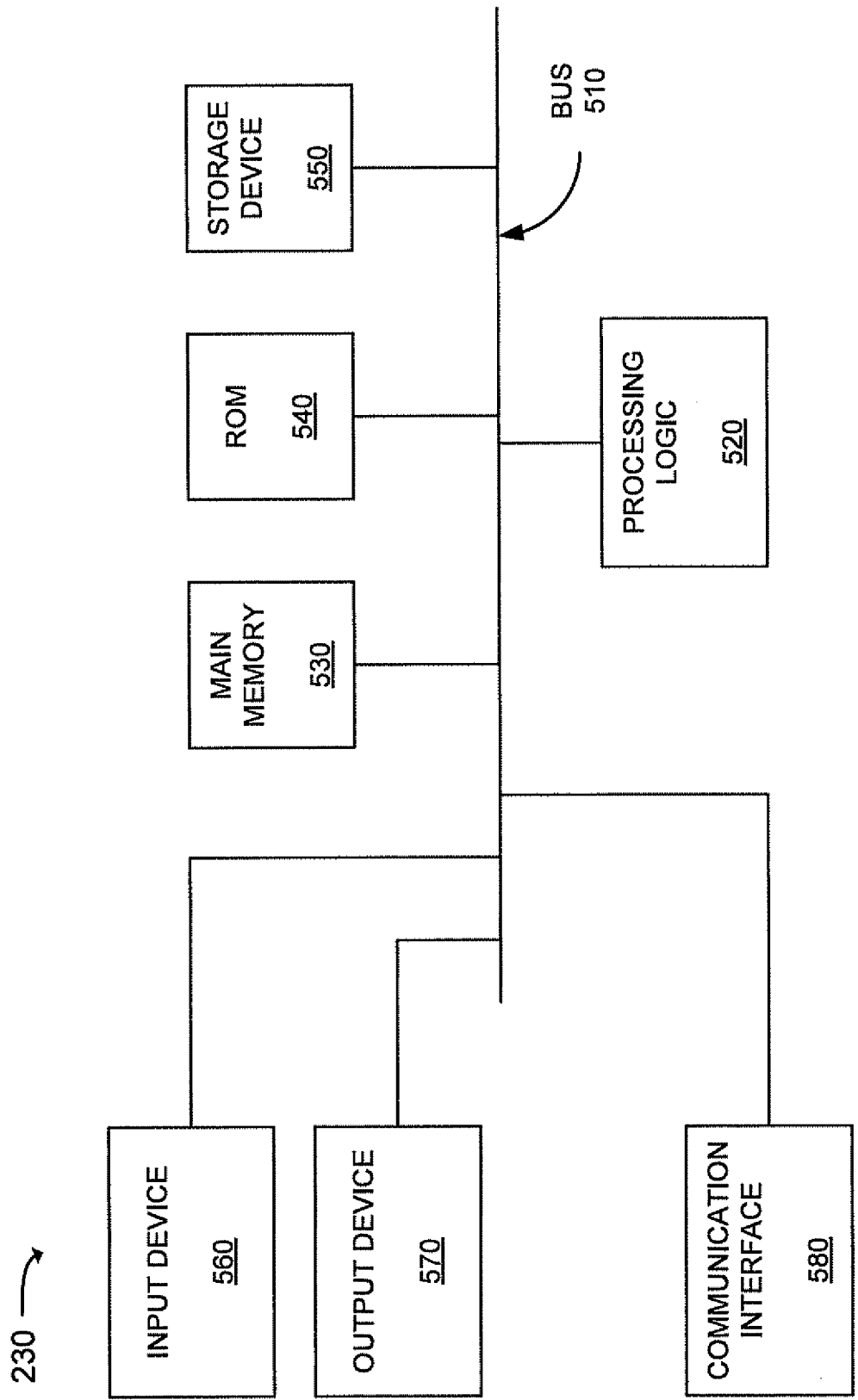
FIG. 5 is an exemplary block diagram of the server of FIG. 2.

FIG. 5 is an exemplary diagram of server 230 according to an exemplary embodiment. As illustrated, server 230 may include a bus 510, processing logic 520, a main memory 530, a ROM 540, a storage device 550, an input device 560, an output device 570, and a communication interface 580. It will be appreciated that server 230 may include additional (or other) components than illustrated in FIG. 5.

Bus 510 may include a path that permits communication among the elements of server 230. Processing logic 520 may include a processor, microprocessor, or other type of processing logic, such as an ASIC, FPGA, etc., that may interpret and execute instructions. Main memory 530 may include a RAM or another type of dynamic storage device that may store information and instructions for execution by processing logic 520. ROM 540 may include a ROM device or another type of static storage device that may store static information and instructions for use by processing logic 520. Storage device 550 may include a magnetic and/or optical recording medium and its corresponding drive.

Input device 560 may include a mechanism that permits an operator to input information to server 230, such as a keyboard, a mouse, a pen, voice recognition and/or biometric mechanisms, a touch-screen interface, etc. Output device 570 may include a mechanism that outputs information to the operator, including a display, a printer, a speaker, etc. Communication interface 580 may include any transceiver-like mechanism that enables server 230 to communicate with other devices and/or systems, such as set-top box 210.

As will be described in detail below, server 230 may perform certain operations. Server 230 may perform these, and other operations, in response to processing logic 520 executing software instructions contained in a computer-readable medium, such as main memory 530.

The software instructions may be read into main memory 530 from another computer-readable medium, such as storage device 550, or from another device via communication interface 580. The software instructions contained in main memory 530 may cause processing logic 520 to perform processes that will be described later. Alternatively, hardwired circuitry may be used in place of, or in combination with, software instructions to implement processes consistent with exemplary embodiments. Thus, embodiments described herein are not limited to any specific combination of hardware circuitry and software.

FIG. 6 is a portion of an exemplary database 600 that may be associated with server 230. While only one database is described below, it will be appreciated that database 600 may consist of multiple databases stored locally at server 230, or stored at one or more different and possibly remote locations.

As illustrated, database 600 may maintain a group of entries in the following exemplary fields: a user identification (ID) field 610, a date field 620, a time field 630, a channel field 640, and a program identification field 650. Database 600 may maintain additional or different information (not shown) relating to providing information regarding programs watched by users. Moreover, in some embodiments, one or more of the fields illustrated in FIG. 5 may be replaced with one or more other fields. For example, the date field, time field, channel field, and/or program identification field may be replaced with a single field that stores an identifier that represents the date, time, channel, and identification of a program to which set-top box 210 was tuned.

User identification field 610 may store information that uniquely identifies a user. The information may include, for example, an alphanumeric sequence of characters. As an alternative to (or in addition to) user identification information, user identification field 610 may store information identifying a set-top box through which the program was viewed. Date field 620 may store information that identifies a date on which a program was viewed. The date may be stored in a variety of formats. In the example illustrated in FIG. 6, the date may be stored in a month/day/year format. Time field 630 may store information that identifies a start time and/or a time period in which a program was viewed. The time or time period may be stored in a variety of formats. In the example illustrated in FIG. 6, the time may be stored in an hour:minute format. Channel field 640 may store information identifying a channel that was viewed at the date and time identified in date field 620 and time field 630, respectively. Program identification field 650 may store information identifying a program that was viewed at the date and time identified in date field 620 and time field 630, respectively, and on the channel identified in channel field 640. The information may include a name of the program and may also include an episode number and/or name.

Figure 7:
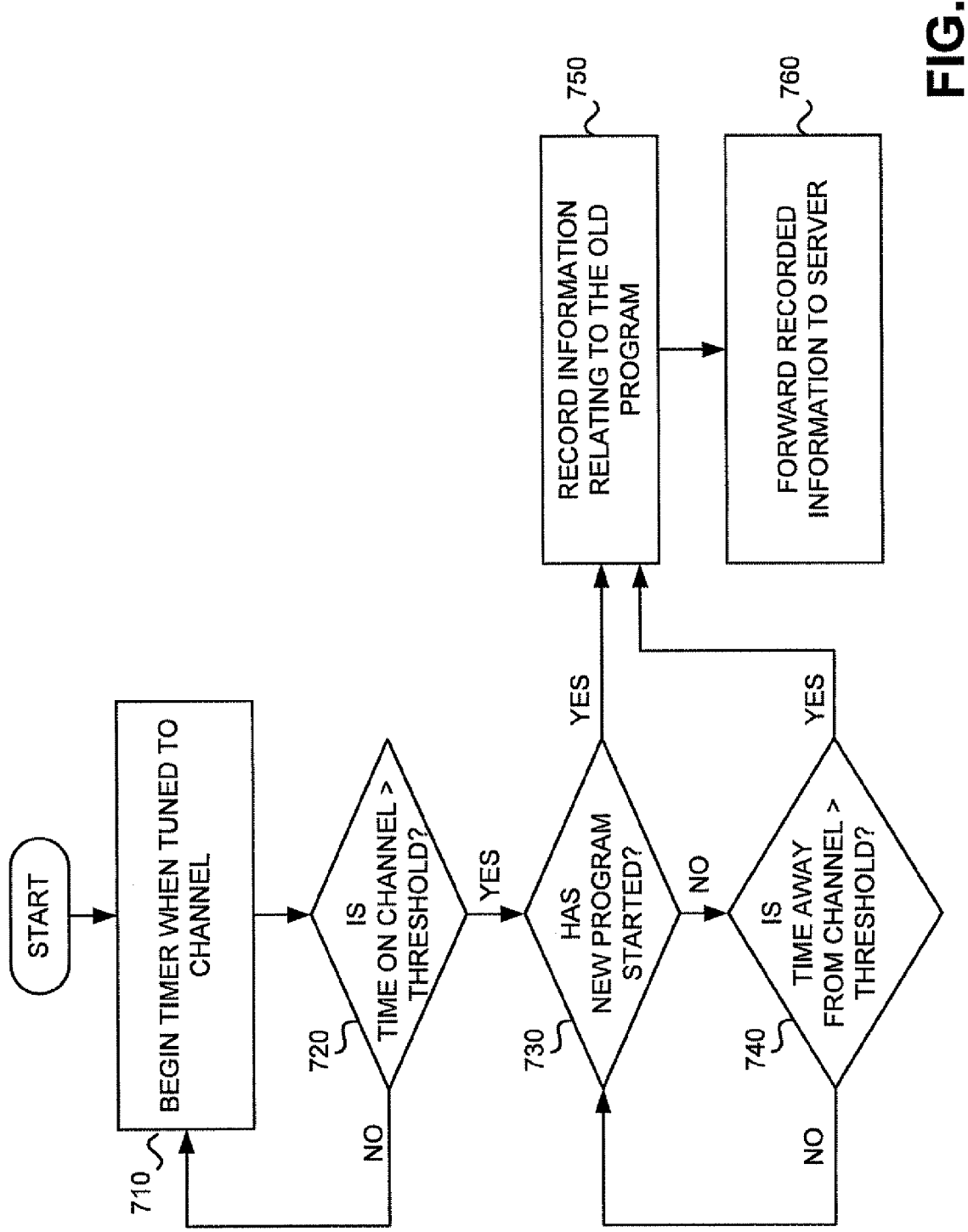
FIG. 7 is a flow chart of exemplary processing for recording program viewing information.

FIG. 7 is a flow chart of exemplary processing for recording television viewing information. In one embodiment, the processing of FIG. 7 may be performed by set-top box 210. In another embodiment, some or all of the processing described below may be performed by another device.

Processing may begin with set-top box 210 starting a timer (e.g., a timer in timer module 410) when set-top box 210 is tuned to a channel (block 710). A user may tune set-top box 210 to a channel by, for example, turning on set-top box 210, waking set-top 210 from a sleep or hibernation mode, selecting a channel up button, selecting a channel down button, entering a channel number into set-top box, etc. According to some embodiments, set-top box 210 may not start a timer in timer module 410 until a channel is tuned for more than a first threshold period of time (to avoid starting a timer for a channel when the user is channel surfing). The first threshold may be a small amount of time, such as 10 seconds.

Set-top box 210 may determine whether the time tuned to the channel exceeds a second threshold (block 720). For example, set-top box 210 may compare the time on the timer to the second threshold. The second threshold may be a user-configurable threshold. The second threshold may be a larger amount of time than the first threshold. For example, the second threshold may be 10 minutes.

If the time tuned to the channel does not exceed the second threshold (block 720—NO), processing may return to block 710 with the timer continuing to track the time tuned to the channel. In some embodiments, set-top box 210 may continue tracking a user's time on one channel if the user tunes to a new channel and returns to the old channel within a period of time (e.g., in less than 5 minutes). In this situation, set-top box 210 may begin a new timer in timer module 410 when the user tunes to the new channel, while continuing to run the timer on the old channel. Alternatively, set-top box 210 may pause the timer on the old channel and resume the timer if the user returns to the old channel within the period of time.

If the time tuned to the channel exceeds the second threshold (block 720—YES), set-top box 210 may determine whether a new program has started on the channel (block 730). For example, a user may watch a first program on channel 100 and, on the hour or half hour, a new program may begin on channel 100.

If a new program has not started on the channel (block 730—NO), set-top box 210 may determine whether a time away from the channel exceeds a third threshold (block 740). For example, set-top box 210 may start a timer when set-top box 210 is tuned to a new channel and may compare this new timer to the third threshold. The third threshold may be set to a short amount of time (e.g., about 2 or 3 minutes) to allow the user to tune to a different channel during commercials and back to the old channel to watch the program that they were viewing. The third threshold may be user-configurable.

If set-top box 210 determines that the time away from the channel does not exceed the third threshold (block 740—NO), processing may return to block 730 with set-top box 210 determining whether a new program has started on the channel (block 730).

If set-top box determines that a new program has started on the channel (block 730—YES) or that the time away from the channel exceeds the threshold (block 740—YES), set-top box 210 may record information relating to the previous program (also called the "old program"), via, for example, program viewing recorder module 420. The information may include, for example, the date that the old program was watched, the time that the old program was watched (including possibly a time range), the channel to which set-top box 210 was tuned, information identifying the old program (e.g., the name of the old program, the name of the episode, etc.), and/or other information. As indicated above, set-top box 210 may alternatively or additionally record a code (or group of codes) that represents the date, the time, the channel, and/or some or all of the information identifying the old program. Set-top box 210 may reset all timers for the old program.

Set-top box 210 may forward the recorded information to a server, such as server 230 (block 760). Server 230 may store the recorded information, for example, in a database, such as database 600. Set-top box 210 may forward the recorded information in response to recording the information or may forward a group of recorded information at a set time (e.g., once an hour, once a day, once a week, etc.). In addition to recorded program viewing information, set-top box 210 may also send information identifying the user with which set-top box is associated. Alternatively, set-top box 210 may send information identifying set-top box 210.

In some embodiments, set-top box 210 may locally store some or all of the recorded program viewing information (in addition to sending the recorded information to server 230 or as alternative to sending the recorded information to server 230). Set-top box 210 may store the recorded program viewing information in, for example, memory 330.

Figure 8:
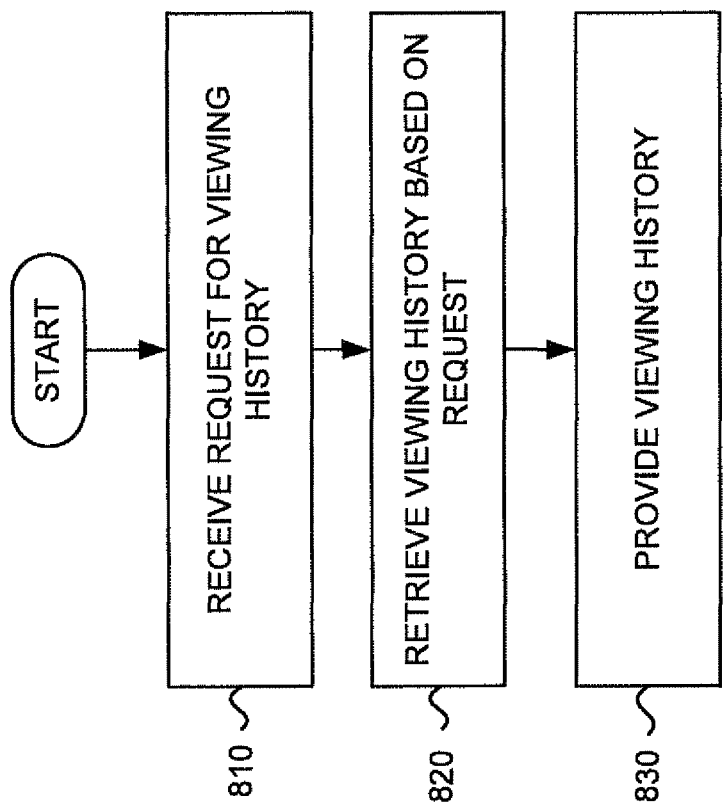
FIG. 8 is a flow chart of exemplary processing for providing program viewing information.

FIG. 8 is a flow chart of exemplary processing for providing program viewing history information according to an exemplary embodiment. Processing may begin with set-top box 210 receiving a request for program viewing information (block 810). The request may be generated in response to a user action. For example, the request may be received via a remote control (e.g., by the user pressing one or more keys on the remote control), by the user pressing one or more buttons on set-top box 210, and/or in another manner.

The request may include a request for program viewing history information for a particular date, a particular date range, a particular date and time, a particular date and time range, a particular time, a particular time range, etc. Alternatively, the request may include a request for other information. For example, the request may include a request for a particular program (e.g., a request for all times when the program was previously viewed), a particular program and a date or date range, etc.

Set-top box 210 may retrieve the requested program viewing history information based on the request (block 820). For example, set-top box 210 may retrieve the requested program viewing history information from a local memory, such as memory 330, or may send a request to a server, such as server 230, for the requested information. The request to server 230 may include information identifying the user associated with set-top box 210 and/or information identifying set-top box 210. In response to the request, server 230 may lookup the requested information (e.g., in database 600) and provide the requested information to set-top box 210 (e.g., via network 240).

Set-top box 210 may provide the requested program viewing history information to the user (block 830). For example, set-top box 210 may provide the requested program viewing history information visually to the user (e.g., via display 220). Alternatively, set-top box 210 may provide the requested program viewing history information audibly to the user (e.g., via a speaker). The requested program viewing history information may also be provided to the user in other ways.

Figure 9:
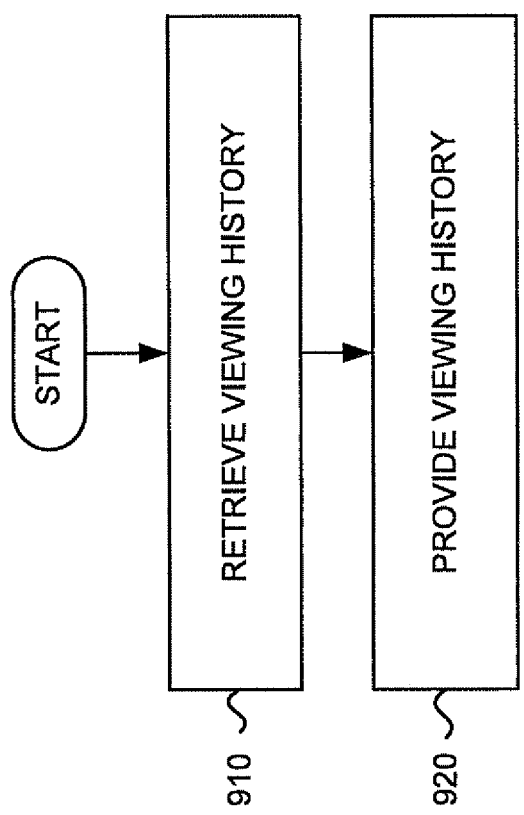
FIG. 9 is a flow chart of another exemplary process for providing television viewing information.

FIG. 9 is a flow chart of another exemplary process for providing program viewing information according to an exemplary embodiment. Processing may begin with set-top box 210 automatically retrieving program viewing history information (block 910). In one embodiment, set-top box 210 may be configured to automatically retrieve program viewing history information (e.g., every half hour, every hour, etc.). Moreover, set-top box 210 may be configured to automatically retrieve certain program viewing history information (e.g., retrieve information relating to the program that the user watched at this time last week). In another embodiment, set-top box 210 may be configured to retrieve program viewing history information relating to an additional set-top box 210, such as another set-top box 210 associated with a location of the first set-top box 210. In this manner, program viewing history information for a number of related set-top boxes 210 may be retrieved.

Set-top box 210 may retrieve the program viewing history information from a local memory, such as memory 330, or may send a request to a server, such as server 230, for the program viewing history information. The request to server 230 may include information identifying the user associated with set-top box 210 and/or information identifying set-top box 210. In response to the request, server 230 may lookup the requested information (e.g., in database 600) and provide the requested information to set-top box 210 (e.g., via network 240).

Set-top box 210 may provide the program viewing history information to the user (block 920). For example, set-top box 210 may provide the program viewing history information visually to the user (e.g., via display 220). In one embodiment, set-top box 210 may cause the program viewing history information to be displayed in a pop-up window on display 220, via a scroll bar (e.g., at the bottom of display 220), and/or via other ways. Alternatively, set-top box 210 may provide the program viewing history information audibly to the user (e.g., via a speaker).

The following examples of FIGS. 10A-13 illustrate the processing described above with respect to FIGS. 8 and 9. In a first example 1000 described with respect to FIG. 10A, assume that a user desire to view program viewing history information. Set-top box 210 may provide an input screen 1010 to the user (e.g., via display 220) that allows the user to specify the program viewing history information that is desired. The user may provide (e.g., via a remote control) information regarding the desired program viewing history to input screen 1010, such as a date, a date range, a date and time, a date and time range, etc. In example 1000 illustrated in FIG. 10A, the user has requested program viewing history information for Jul. 7, 2006.

In response, set-top box 210 may retrieve the requested information and provide the requested program viewing history information 1020 via, for example, display 220, as illustrated in FIG. 10B. As illustrated, the program viewing history information may include, for example, the times that programs were viewed on Jul. 7, 2006, the channels on which they were viewed, and the name of the programs that were viewed. For example, the program viewing information indicates that the user viewed a show called "The Sports Show" at 7:30 PM on channel 5 on Jul. 7, 2006.

Figure 10C:
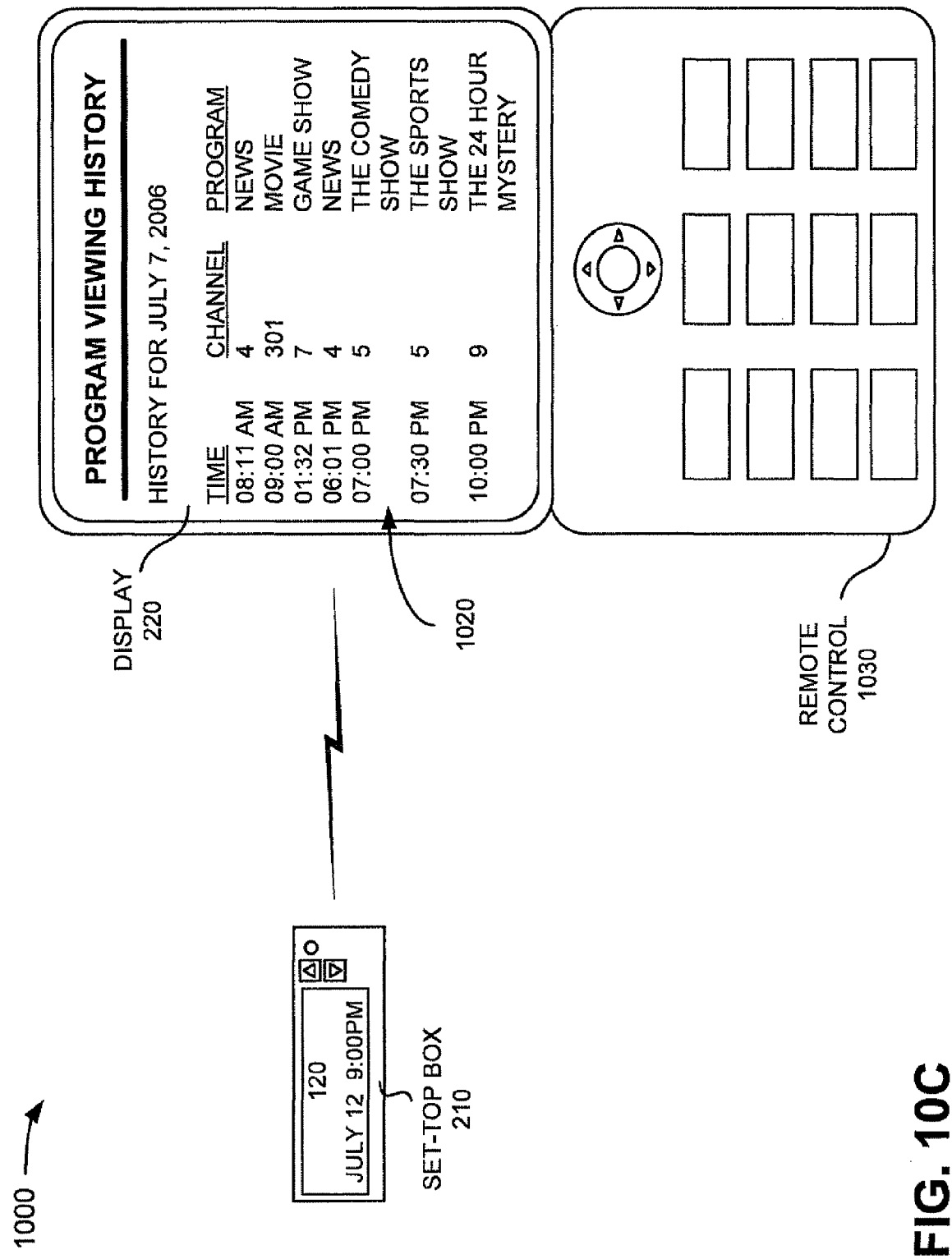

As indicated above, display 220 may be integrated, in another embodiment, into a device, such as a remote control. This embodiment is illustrated in FIG. 10C where display 220 is integrated into remote control 1030. Set-top box 210 may transmit program viewing history information 1020 to remote control 1030. In this way, program viewing history information 1020 may be presented to the user via display 220 associated with remote control 1030.

Figure 11A:
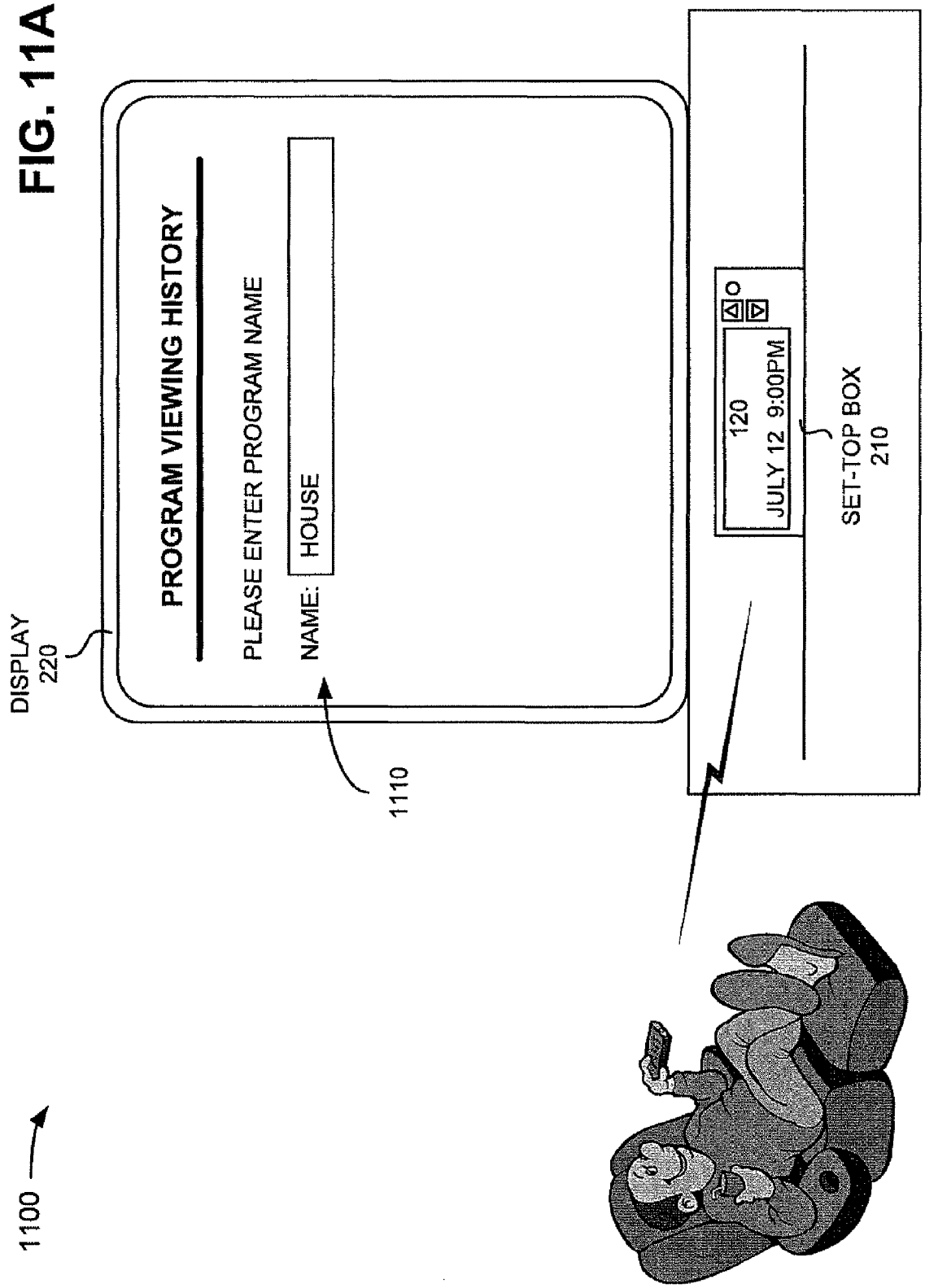

As a second example 1100 set forth in FIGS. 11A and 11B, assume that a user desires to view when the user has previously viewed a particular program. Set-top box 210 may provide an input screen 1110 to the user (e.g., via display 220) that allows the user to specify the program viewing history information that is desired, as illustrated in FIG. 11A. The user may provide (e.g., via a remote control) information regarding the desired program viewing history to input screen 1110, such as a name of a program. In the example illustrated in FIG. 11A, the user has requested program viewing history information for programs that include the word "HOUSE."

In response, set-top box 210 may retrieve the requested information and provide the requested program viewing history information 1120 via, for example, display 220, as illustrated in FIG. 11B. As illustrated, the program viewing history information may include, for example, the dates and times that programs containing the word "HOUSE" were viewed, the channels on which the programs that contain the word "HOUSE" were viewed, and the names of the programs that were viewed that contain the word "HOUSE." For example, the user viewed a show called "This Old House" on Jan. 2, 2006, Jan. 9, 2006, Jan. 23, 2006, and Feb. 27, 2006 at roughly 10:00 PM on channel 194.

As a third example 1200 described with respect to FIG. 12, set-top box 210 may automatically provide program viewing history information. As illustrated, assume that a user is watching a football game on display 220. As the user is viewing the football game on display 220, set-top box 210 may cause a program viewing history alert 1210 to appear on display 220. As indicated above, set-top box 210 may be configured to retrieve specific program viewing history information (e.g., program viewing history information relating to the program that the user viewed at the same time last week). In example 1200, the user may be reminded that the user viewed a program called "This Old House" at 9:00 PM on Jul. 5, 2006. This information may aid the user in determining what to watch. Set-top box 210 may display alert 1210 in a portion of display 220 (e.g., at the bottom of the screen, as illustrated in FIG. 12). Alternatively, set-top box 210 may cause the alert to be audibly provided.

While the above processing focused on retrieving program viewing history information via a set-top box, embodiments described herein are not so limited. FIG. 13 illustrates another example 1300 according an exemplary embodiment. As illustrated, program viewing history information may be retrieved by another type of network device. Alternatively, program viewing history information may automatically be provided to another type of network device (e.g., as an alert) via any known technique (e.g., a text message, an instant message, an electronic mail message, a page, a facsimile, etc.).

In example 1300, a device 1310 may retrieve program viewing history information for a subscriber. Device 1310 may include a computational or communication device, such as a personal computer, lap top, a personal digital assistant (PDA), a cell phone, or another type of device capable of retrieving data via a network, such as network 240. In example 1300, device 1310 may access a web site that is associated with server 230 using, for example, a web browser. In some embodiments, a user of device 1310 may log into server 230 by providing identification information (e.g., a user identifier and/or password) in order to access the web site.

Device 1310 may send a request to server 230 for particular program viewing history information. The request may include a request for program viewing history information for a particular date, a particular date range, a particular date and time, a particular date and time range, a particular time, a particular time range, etc. Alternatively, the request may include a request for other information. For example, the request may include a request for a particular program (e.g., a request for all times when the program was previously viewed), a particular program and a date or date range, etc. Server 230 may retrieve the requested information and provide the requested information to device 1310.

Embodiments described herein provide program viewing history information. A set-top box may track what a user is viewing and may provide information relating to previously viewed programs. The program viewing history information may aid a user in determining what to currently view and/or allow, for example, a parent to determine what a child (or other user) has been watching.

The foregoing description of exemplary embodiments provides illustration and description, but is not intended to be exhaustive or to limit the invention to the precise form disclosed. Modifications and variations are possible in light of the above teachings or may be acquired from practice of the invention. For example, while series of acts have been described with respect to FIGS. 7-9, the order of the acts may be varied in other implementations consistent with the invention. Moreover, non-dependent acts may be implemented in parallel.

The exemplary embodiments, as described above, may be implemented in many different forms of software, firmware, and hardware in the implementations illustrated in the figures. The actual software code or specialized control hardware used to implement the exemplary embodiments described herein is not limiting of the invention. Thus, the operation and behavior of the exemplary embodiments were described without reference to the specific software code—it being understood that one would be able to design software and control hardware to implement the exemplary embodiments based on the description herein.

Further, certain portions of the invention may be implemented as "logic" that performs one or more functions. This logic may include hardware, such as an application specific integrated circuit, a field programmable gate array, a processor, or a microprocessor, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
  a set-top box to:
    track a plurality of parameters relating to a first program to which the set-top box is tuned,
      the plurality of parameters including information relating to a date, a time, a name of the first program, and user identification information,
    when tracking the plurality of parameters, the set-top box is to:
      initiate a first timer, for the first program, when the set-top box is tuned to the first program for a time exceeding a first threshold corresponding to a first time duration,
      pause the first timer when the set-top box is tuned to another program,
      track an amount of time that the set-top box is tuned away from the first program, and
      resume the first timer when the set-top box is retuned to the first program and the amount of time away from the first program does not exceed a second threshold corresponding to a second time duration different than the first time duration,
      when the set-top box is retuned to the first program, the first timer being not resumed when the amount of time away from the first program exceeds the second threshold,
    detect that a second program has started based on tracking the plurality of parameters relating to the first program,
    store the tracked plurality of parameters relating to the first program when the second program has started, and
    provide the tracked plurality of parameters to a user.

2. The system of claim 1 where the set-top box is further to:
  transfer the tracked plurality of parameters to a remote server.

3. The system of claim 2 where, when providing the tracked plurality of parameters, the set-top box is to:
  send a request for the tracked plurality of parameters to the remote server, and
  receive the tracked plurality of parameters from the remote server.

4. The system of claim 1 where, when providing the tracked plurality of parameters, the set-top box is to:
  cause the tracked plurality of parameters to be provided visually.

5. The system of claim 1 where, when providing the tracked plurality of parameters, the set-top box is to:
  cause the tracked plurality of parameters to be provided audibly.

6. The system of claim 1 where the set-top box provides the tracked plurality of parameters automatically.

7. The system of claim 1 where the set-top box provides the tracked plurality of parameters based on a request from the user.

8. A method comprising:
  tracking, by a set-top box, program viewing information,
    tracking the program viewing information including:
      initiating a first timer, associated with the set-top box, when the set-top box is tuned to a first program on a first channel,
      determining whether a first time period tracked by the first timer exceeds a first threshold associated with a first amount of time,
      initiating a second timer when the set-top box is tuned to another program on a second channel and the first time period exceeds the first threshold, the second channel being different than the first channel, and
      determining whether a second time period tracked by the second timer exceeds a second threshold associated with a second amount of time,
        the second amount of time being different than the first amount of time;
  when the second time period does not exceed the second threshold:
    determining, by the set-top box, whether a second program, on the first channel, has started when the set-top box is tuned to the other program on the second channel, and
    storing, by the set-top box, the tracked program viewing information for the first program when the second program has started; and
  when the second time period exceeds the second threshold:

storing, by the set-top box and independent of determining whether the second program has started, the tracked program viewing information for the first program when the set-top box is tuned to the other program on the second channel.

9. The method of claim 8 where tracking the program viewing information further includes:
storing information relating to a third program when the set-top box is tuned to the third program for a time period that exceeds a third threshold.

10. The method of claim 8 where storing the tracked program viewing information, when the second time period exceeds or does not exceed the second threshold, includes:
storing the program viewing information locally at the set-top box.

11. The method of claim 8 where storing the tracked program viewing information, when the second time period exceeds or does not exceed the second threshold, includes:
transferring the program viewing information to a server for storage.

12. The method of claim 11 further comprising:
retrieving, via the set-top box, the program viewing information from the server; and
providing the retrieved program viewing information to a user.

13. The method of claim 11 further comprising:
retrieving, via a web browser, the program viewing information from the server; and
providing the retrieved program viewing information to a user.

14. The method of claim 8 further comprising:
automatically providing, via the set-top box, the tracked program viewing information to a user.

15. The method of claim 8 further comprising:
providing, via the set-top box, the tracked program viewing information based on a request from a user.

16. The method of claim 8 where the program viewing information includes a date associated with tracking the program information, a time associated with tracking the program information, a name of the first program, and user identification information, the user identification comprising at least one of information identifying a user of the set-top box or information identifying the set-top box.

17. A method performed by a set-top box, the method comprising:
tracking program information for a first program on a first channel to which the set-top box is tuned,
the program information including information relating to a date associated with the first program, information relating to a time associated with the first program, a name of the first program, and user identification information;
initiating a first timer for the first program when the set-top box is tuned to the first program for a time exceeding a first threshold that is associated with a first period of time;
initiating a second timer, different than the first timer, when the set-top box is tuned away from the first program to another program on a second channel that is different than the first channel;
tracking an amount of time that the set-top box is tuned away from the first program based on the second timer;
when the tracked amount of time does not exceed a second threshold that is associated with a second period of time different than the first period of time:
determining whether a second program, on the first channel, has started when the set-top box is tuned away from the first program to the other program on the second channel, and
recording the tracked program information for the first program when the second program has started;
when the tracked amount of time exceeds the second threshold:
recording the tracked program information for the first program when the set-top box is tuned away from the first program to the other program on the second channel; and
automatically providing, via the set-top box and during a third program, an alert relating to the recorded program information,
automatically providing the alert comprising automatically retrieving particular information, of the recorded program information, based on a current time during which the third program is provided.

18. The method of claim 17 further comprising:
recording program information associated with the third program when the set-top box is tuned to the third program for a time period that exceeds the first threshold.

19. The method of claim 18 where the first threshold is user-configurable.

20. A method performed by a network device, the method comprising:
receiving program information for a first program to which a first network device is tuned,
the program information including a date associated with the first program, a time associated with the first program, a name of the first program, and user identification information;
initiating a first timer for the first program when the first network device is tuned to the first program for a time exceeding a first threshold associated with a first time duration;
pausing the first timer when the first network device is tuned away from the first program to another program;
tracking a period of time that the first network device is tuned away from the first program;
resuming the first timer when the first network device is retuned to the first program and the period of time away from the first program does not exceed a second threshold associated with a second time duration different than the first time duration,
when the first network device is retuned to the first program, the first timer being not resumed when the period of time away from the first program exceeds the second threshold;
storing the program information for the first program in a memory, based on an amount of time tracked by the first timer,
the memory storing information for a plurality of programs, the information for at least one of the plurality of programs including a date, a time, a program name, and user identification information;
retrieving the program information, for the first program, from the stored information for the plurality of programs; and
providing the retrieved program information, for the first program, to a second network device different than the first network device.

21. The method of claim 20 where the first network device includes a set-top box and the second network device includes at least one of a personal computer, a laptop, a personal digital assistant, or a cell phone.

22. The method of claim 20 where providing the retrieved program information includes at least one of:
   automatically sending the program information to the second network device, or sending the program information to the second network device based on a request from the second network device.

23. The method of claim 22, where sending the program information to the second network device comprises:
   receiving the request from the second network device, the request comprising the user identification information included in the program information for the first program; and
   retrieving the program information based on the received request.

24. The method of claim 17, where at least one of the first threshold or the second threshold is user-configurable.

25. The method of claim 17, where the program information for the first program is tracked on a first date,
   where the third program is provided on a second date, following the first date, and
   where the alert is automatically provided based on the current time, on the second date, corresponding to a time, on the first date, when the program information for the first program was tracked.

* * * * *